(12) United States Patent
Kotelba

(10) Patent No.: US 8,554,656 B2
(45) Date of Patent: Oct. 8, 2013

(54) COMPUTERIZED INVESTOR ADVISEMENT AND INVESTMENT MANAGEMENT SYSTEM

(75) Inventor: Marek R Kotelba, Rockville, MD (US)

(73) Assignee: Envarix Systems Inc., Rockville, MD (US)

( * ) Notice: Subject to any disclaimer, the term of this patent is extended or adjusted under 35 U.S.C. 154(b) by 0 days.

(21) Appl. No.: 13/314,132

(22) Filed: Dec. 7, 2011

(65) Prior Publication Data

US 2012/0150768 A1  Jun. 14, 2012

Related U.S. Application Data

(60) Provisional application No. 61/421,364, filed on Dec. 9, 2010.

(51) Int. Cl.
*G06Q 40/00* (2012.01)
(52) U.S. Cl.
USPC ........................................ 705/36 R
(58) Field of Classification Search
None
See application file for complete search history.

(56) References Cited

U.S. PATENT DOCUMENTS

| | | | |
|---|---|---|---|
| 5,930,774 A | 7/1999 | Chennault |  |
| 6,453,303 B1 | 9/2002 | Li |  |
| 6,484,152 B1 | 11/2002 | Robinson |  |
| 7,013,291 B1 | 3/2006 | Green |  |
| 7,020,629 B1 | 3/2006 | Kihn |  |
| 7,177,831 B1 | 2/2007 | O'Shaughnessy et al. |  |
| 7,212,996 B1 | 5/2007 | Carnahan et al. |  |
| 7,222,095 B2 | 5/2007 | Squyres |  |
| 7,299,205 B2 | 11/2007 | Weinberger |  |
| 7,590,582 B2 | 9/2009 | Dunne |  |
| 7,610,230 B2 | 10/2009 | Festog et al. |  |
| 2005/0033676 A1 | 2/2005 | Charnley, Jr. |  |
| 2005/0171881 A1 | 8/2005 | Ghassemieh et al. |  |
| 2006/0184438 A1 | 8/2006 | McDow |  |
| 2006/0253360 A1* | 11/2006 | Gould | 705/35 |
| 2007/0033129 A1 | 2/2007 | Coates |  |
| 2007/0055602 A1 | 3/2007 | Mohn |  |
| 2007/0124227 A1 | 5/2007 | Dembo et al. |  |
| 2007/0299785 A1 | 12/2007 | Tullberg |  |
| 2008/0208769 A1* | 8/2008 | Beer et al. | 705/36 R |

OTHER PUBLICATIONS

Mun, Johnathan. Real Options Analysis: Tools and Techniques for Valuing Strategic Investments and Decisions. 2nd Edition. John Wiley & Sons. 2006. pp. 80-81 and 143-145.*
Trillion Dollar Babies, From the Economist print edition, Jan. 21, 2010.

(Continued)

*Primary Examiner* — Jason M Borlinghaus
(74) *Attorney, Agent, or Firm* — Nath, Goldberg & Meyer; Jerald L. Meyer; Stanley N. Protigal

(57) ABSTRACT

A system and method for evaluating, substituting and optimizing investment asset portfolios based on performance history to facilitate the investment process. An analyzed investment portfolio is compared to a dynamically composed reference portfolio of exchange-traded products whose periodic returns best approximate periodic returns of the analyzed portfolio. Excess periodic returns of the analyzed portfolio over those of the reference portfolio are discounted in time by a risk-adjusted rate, and the resulting normalized measure is used to rate and rank the analyzed portfolios. The analyzed portfolio is substituted with the reference portfolio through a periodic execution of adjustment trades in the latter, so that returns are closely tracked over time. The analyzed portfolio is optimized by using a lag fit of the reference portfolio, which smoothes out suboptimal market timing and macro-based investment decisions of the analyzed portfolio manager.

27 Claims, 8 Drawing Sheets

(56) References Cited

OTHER PUBLICATIONS

When Indexing Really Shines, Karen Hube, WSJ, Nov. 2, 2009.
ETFs Set to Gain More Market Share from Mutual Funds in 2011, Tom Graves, Standard & Poor's The Outlook, Jan. 19, 2011.
What Exactly Are 12b-1 Fees, Anyway, Karen Damato, WSJ, Jul. 6, 2010.
State of the Mutual Fund Industry, Vaughan Scully, Standard & Poor's The Outlook, Mar. 10, 2010.
Exchange-Traded Funds. The ABCs of ETFs, Jonathan Burton, WSJ, Apr. 6, 2009.
Why Fund Managers' Hot Performance Isn't So Hot, Jason Zweig, WSJ, Mar. 27, 2010.
ETFs Bring Hedge Funds to the Masses, Vaughan Scully, Standard & Poor's The Outlook, Jan. 26, 2011.
The Hidden Costs of Mutual Funds, Anna Prior, WSJ, Mar. 1, 2010.
Better than beta, From The Economist print edition, Feb. 28, 2008.
Wasting Assets, From The Economist print edition, Jun. 18, 2009.
The Incredible Shrinking Fee, Jonathan Burton, WSJ, Jan. 5, 2011.
If Index Funds Perform Better, Why Are Actively Managed Funds More Popular, Knowledge@Wharton, Feb. 2, 2011.
Momentum in the Financial Markets, Why Newton was wrong, The Economist, Jan. 6, 2011.
The Return of the Market-Beating Fund Manager, Eleanor Laise, WSJ, Dec. 18, 2010.
A New Way to Rate Funds, Daisy Maxey, WSJ, Apr. 4, 2011.
The ABCs of ETFs, Rachel Louise Ensign, WSJ, Apr. 18, 2011.
Timing can be Everything When Picking a Mutual Fund, Ari Bensinger, Standard & Poor's The Outlook, Nov. 24, 2010.
A Better Behaved ETF, Vaughan Scully, Standard & Poor's The Outlook, Mar. 23, 2011.
A Fund Fee That Keeps on Taking, Jason Zweig, WSJ, Jul. 31, 2010.
Legg Mason Names Successor for Bill Miller, Jane J. Kim, WSJ, May 22, 2010.
Bonding with ETFs, Chris Gay, WSJ, Apr. 18, 2011.
Five Things You Should Know About Funds, Brett Arends, WSJ, Apr. 3, 2011.
The Unseen Figures of Your Funds, Sam Mamudi, WSJ, May 3, 2010.
Active, but Not Getting Very Far, Larry Light, WSJ, Apr. 18, 2011.
Beware of Professors Bearing ETFs, Ian Salisbury, WSJ, Sep. 11, 2010.
Hey, Money Managers, Stop Putting the Squeeze on Investors, Jason Zweig, WSJ, Jun. 5, 2010.
The Limits of Free, Emily Glazer, WSJ, Apr. 18, 2011.
How ETFs Have Reshaped Investing, Tom Lauricella, WSJ, Apr. 18, 2011.
Numbers You Can't Count on, Michael A. Pollock, WSJ, Apr. 4, 2011.
Information, Please, Ian Salisbury, WSJ, Apr. 18, 2011.
http://www.styleadvisor.com/resources/concepts/mutual_fund_analysis.html, visited Dec. 7, 2011.

* cited by examiner

*FIG. 5*

| Portfolio Name | Invest_1 /505 | Select Portfolio | Invest_2 /507 |
| | | | Invest_3 |
| Start Date | 1-Mar-2005 /510 | | Invest_4 |
| End Date | 30-Nov-2010 /515 | | |

| Security Symbol | Quantity | Acquisition Date (optional) | Disposition Date (optional) |
|---|---|---|---|
| SLASX /520-n | 26.532 /525-n | /530-n | /535-n |
| WPFRX | 50.05 | 16-Sep-2005 | |
| RYTFX | 81.9 | | 24-Apr-2008 |
| HIINX | 16.521 | 28-Nov-2006 | 10-Dec-2007 |
| PTTDX | 94.251 | 1-Mar-2005 | |

| Add /550 | Import /560 | Save /570 | Delete /580 | Cancel /590 |

COMPUTERIZED INVESTOR ADVISEMENT AND INVESTMENT MANAGEMENT SYSTEM

CROSS REFERENCE TO RELATED APPLICATIONS

The present application claims the benefit of provisional application 61/421,364, filed Dec. 9, 2010 entitled "System and Method for Investment Portfolio Evaluation, Substitution and Optimization"

FIELD OF THE INVENTION

The present invention relates generally to computerized systems for analyzing potential investments, advising investors and automatic investment portfolio management.

BACKGROUND

The present invention relates to evaluating, substituting and optimizing investment asset portfolios based on performance history to facilitate the investment process. An investment asset portfolio may consist of any combination of long and short positions in domestic and foreign, common and preferred stocks; corporate and government bonds; convertible securities; real estate securities; commodities; options, futures and similar derivative contracts; and any other tradable investment instruments. In the preferred embodiment of the present invention, the aforementioned portfolio is one and the same with a portfolio of holdings of a single mutual fund. In another embodiment, the aforementioned portfolio comprises a plurality of positions in various mutual funds. In yet another embodiment, the aforementioned portfolio comprises any arbitrary combination of the above investment instruments selected by a professional portfolio manager or an individual investor. In all cases, for the purpose of this specification, the aforementioned portfolio is referred to as the analyzed portfolio. The analyzed portfolio is characterized by periodic returns, such as the daily, weekly, monthly, quarterly or yearly (annual) relative increases or decreases in portfolio value, which facilitate comparing the performance of the analyzed portfolio to that of alternative portfolios.

In contrast to the analyzed portfolio, the term reference portfolio denotes an investment asset portfolio that comprises exchange traded funds (ETFs), exchange traded vehicles (ETVs), exchange traded notes or certificates (ETNs), Standard and Poor's Depositary Receipts (SPDRs), Holding Company Depositary Receipts (HOLDRs), and/or index mutual funds. For the purpose of this specification, these investment instruments are collectively referred to as exchange-traded products (ETPs). The ETPs were first introduced to the financial markets in the early 1990s, and have recently gained in popularity among individual and institutional investors. The main advantages of ETPs are their broad representation of the various market indices, diversification over many individual securities, low management expenses, tax-efficient structure, transparency, good liquidity, and, with the exception of index mutual funds, an intra-day trading capability. In addition, large brokerage and mutual fund firms have lately introduced a low-commission or no-commission trading of a significant number of ETPs, which facilitates periodic portfolio adjustments.

The fundamental factors that determine the performance of any investment portfolio are its periodic return and risk. The return of a portfolio is typically calculated as a linear percentage of increase or decrease of the portfolio value over an evaluation period, such as a day, week, month, quarter, or year (annual) period. In addition, given the log-normal distribution of portfolio returns over time, a natural logarithm of the ratio of the ending and starting portfolio values, expressed as a percentage, is also used to calculate correlations of returns among various portfolios in a period of time.

The value of the portfolio is determined not only by the sum of prices of the portfolio holdings, but also by the portfolio distributions. These distributions take multiple forms, such as qualified and unqualified dividends; short-term and long-term capital gains; forward and reverse share splits; capital returns; special cash dividends; and other disbursements. Distributions are determined by the underlying portfolio securities, the portfolio trading history, and the regulatory environment. Generally, distributions can take place any time during the portfolio evaluation period. To make the analysis consistent, these distributions must be reflected in corrections to the closing value of a portfolio or security at the end of each evaluation period. These corrections result in an adjusted close price as opposed to a regular close price, such as the one reported for an asset by a stock exchange at the close of a trading day. The adjustment is calculated according to formulae known in the art. In addition, the adjusted close price may take into account a discrepancy between the market value of the portfolio and the sum total of the values of its assets, which, for example, may be the case with certain ETPs trading at a discount. Portfolio returns calculated in the linear and logarithmic manner with the use of adjusted close prices instead of regular close prices are called total returns.

A standard deviation of portfolio returns in an evaluation period is used as a statistical measure of risk (volatility) of a portfolio. Portfolios of risky assets generally exhibit high standard deviation of returns. Desirable portfolios have higher returns at a given level of risk or, conversely, lower risk at a given level of returns, than alternative portfolios.

According to the modern portfolio theory (MPT) and the capital asset pricing model (CAPM), developed from the 1950s to 1970s, the performance of an analyzed portfolio can be measured by an alpha term that encompasses excess, risk-adjusted returns of the portfolio over the market returns, and by a beta factor that links the variability of analyzed returns to that of market returns. The desirable characteristics of high alpha and low beta of a portfolio can be attributed to a number of factors, such as a manager's skill in selection of the underlying securities, market timing, or just pure luck. In general, portfolio managers should be rated by their alpha and not beta performance, with the latter derived from correlation with market returns.

The problem arises with the definition of market returns. Frequently in financial practice, a single large-capitalization U.S. stock market index, such as the Dow Jones Industrial Average (DJIA, introduced in 1896) or Standard and Poor's 500 (S&P 500, introduced in 1957) is assumed to represent a market benchmark. Alternative approaches try to account for smaller capitalization and foreign stocks, as well as domestic and foreign, corporate and government bonds. However, in all these cases, once a single reference index is chosen, it remains largely static, unlike the analyzed portfolio whose composition (membership of individual securities and their corresponding weights in relation to the total value of the portfolio) may frequently and significantly change at the manager's discretion. In addition, the variability of returns of the reference is fixed in the sense that it arises from only the chosen index. Depending on the level of correlation between returns of the analyzed portfolio and reference index, the calculated excess return of the portfolio may lead to erroneous conclusions about its performance, i.e., portfolio returns not systematically explained by returns of the index are mistaken for alpha. Therefore, it is important to align the selection of the benchmark with the nature of the analyzed portfolio.

Another approach, typically used to rate and rank actively-managed mutual funds, is to evaluate analyzed portfolios on a relative basis. In that case, the performance of an analyzed portfolio is periodically compared to an average performance of its peer portfolios. The peers are determined on the basis of having similar holdings, which gives rise to common investment categories or styles, such as large-capitalization growth, mid-capitalization value, or small-capitalization blend stock funds, etc. This approach is erroneous in that it artificially lowers the performance threshold—if most of the peers in a given category underperform the market, which is frequently the case with actively-managed mutual funds, high relative ratings of some funds are misleading. It is also known in the art that newly-acquired high relative ratings result in abnormally large inflows of investments into these funds, which subsequently tend to underperform both their peers and the market, thus providing a disservice to investors. Therefore, it is essential to evaluate analyzed portfolios on an absolute instead of a relative basis, i.e., against a properly-chosen market reference instead of peers.

With actively-managed mutual funds, investors face additional problems of the style drift, market timing, window dressing, excessive trading, abnormally high fees, and index resemblance. Some mutual funds frequently change their investment styles and migrate between investment categories. This means that investors are being misinformed as to the true nature of their investments. Fund managers also tend to engage in market timing, placing large bets on the various macro-economic events they foresee taking place in the future. For example, managers may bet on the direction of interest rates, currency exchange rates, over- or under-performance of specific industries or sectors of the economy, etc. These bets frequently increase volatility of fund returns and generate losses to investors. Because the U.S. mutual funds have to report their holdings quarterly, some managers engage in a practice called window dressing, which entails replacing the under-performing or out-of-style positions with more attractive positions just before the end of the quarter. This deceptive practice misleads fund investors as to the true nature of fund holdings throughout the quarter. Fund managers often engage in short-term trading strategies, which results in excessive portfolio turnover, increased risk, and potential tax liabilities to investors. Frequent changes of a mutual fund portfolio composition due to market timing, window dressing, and short-term trading also result in excessive brokerage fees that decrease the fund's returns to its investors. Fund managers frequently charge investors steep front- and back-end transaction fees, as well as ongoing management, distribution, and other types of fees that further reduce returns. Finally, due to high correlations of returns of individual securities, especially in market downturns, active fund managers find it increasingly difficult to identify securities that generate market-beating returns.

What is needed is a system to critically and automatically evaluate portfolios (i.e., the analyzed portfolios) and output information based on the analysis to the user.

It would be desirable to provide a system that provides for automatic investments in the analyzed portfolios or synthesized reference portfolios that may in some cases be equivalent or superior to the analyzed portfolio.

BRIEF SUMMARY OF THE INVENTION

It is an object of the present invention to provide a mechanism for rating and ranking of analyzed portfolios in a most objective yet practically realizable manner.

It is an object of the present invention to compute alternatives to the analyzed portfolio which are composed of ETPs, and in some cases are equivalent or superior to the analyzed portfolio.

These objectives are, in part, accomplished using a computer system executing a series of steps to compose a reference portfolio of ETPs for each analyzed portfolio.

The ETPs offer an opportunity to construct a reference portfolio that presents a next-best, equal or better and viable alternative to the analyzed portfolio. As mentioned above, the ETPs are generally characterized by a close approximation of a broad array of diversified market indices, low management fees, good trading liquidity, and transparency of holdings. Therefore, ETPs form an excellent investment vehicle, especially when compared to actively-managed mutual funds that suffer from the previously described drawbacks.

In one aspect, the present invention provides a method to automatically and dynamically compose a reference portfolio of ETPs for a given analyzed portfolio. Securities in the reference portfolio are chosen in one of three general ways: manually from the available set at the discretion of an investor, automatically based on a classification of the analyzed portfolio into a specific investment category, or automatically based on the best fit of periodic returns with those of the analyzed portfolio. Weights of securities in the reference portfolio are adjusted automatically so that the difference or a function of the difference (e.g., standard deviation or sum of squares) of returns of the analyzed and reference portfolios is minimized in an evaluation period.

In another aspect of the present invention, with the reference portfolio closely tracking periodic returns of the analyzed portfolio, it is possible to determine the discounted, risk-adjusted alpha of the analyzed portfolio versus the reference portfolio. If the reference portfolio exhibits better return and risk characteristics than the analyzed portfolio, the latter should be substituted by the former for the benefit of the investor. In the opposite case, the analyzed portfolio can be effectively rated and ranked versus other portfolios to provide an objective advice to the investor.

In yet another aspect, the present invention provides a method for analyzing and in certain cases improving upon the analyzed portfolio by applying weights to securities in the reference portfolio with a time lag which inherently arises from the observation of performance history. This results in smoothing out the potentially erroneous management decisions in the analyzed portfolio.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 5 illustrates an exemplary embodiment of a user interface implemented by the system of FIG. 1;

Figure 1:
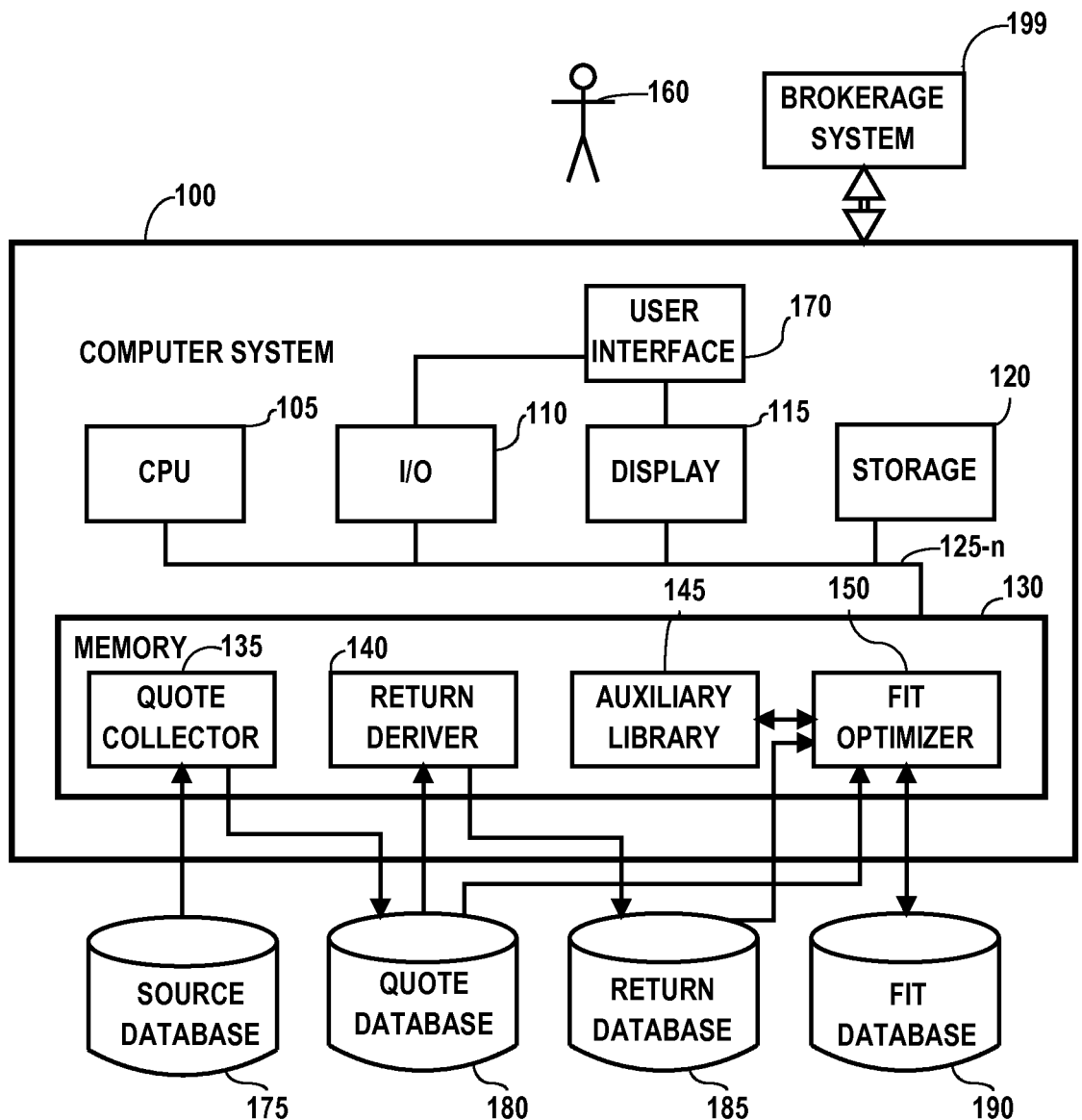
FIG. 1 illustrates a system for evaluating, substituting and optimizing an investment portfolio according to an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to investment analysis and management. Accordingly, the method steps and apparatus components have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of investment analysis and management described herein. The non-processor circuits may include, but are not limited to, communication circuits, signal drivers, clock circuits, power source circuits, and user input devices. As such, these functions may be interpreted as steps of a method to perform investment analysis and management. Alternatively, some or all functions could be implemented by a state machine that has no stored program instructions which may be implemented in one or more application specific integrated circuits (ASICs), in which each function or some combinations of certain of the functions are implemented as custom logic. Alternatively, some or all functions could be implemented in one or more field-programmable gate arrays (FPGAs). Computers equipped for general-purpose computing on graphics processing units (GPGPU) may also be used to some advantage to speed up computations. Of course, a combination of the aforementioned approaches could be used. Thus, methods and apparatus for performing these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

FIG. 1 illustrates a computerized financial system for analyzing an investment portfolio and synthesizing an alternative portfolio according to embodiments of the invention. The exemplary system includes, for example, a computer system 100, a source database 175, a quote database 180, a return database 185, and a fit database 190. The computer system 100 could be, for example, a microprocessor-based personal computer (PC) or server, or other computer system having suitable processing power, memory, and storage. The computer system 100 includes, for example, a central processing unit (CPU) 105, such as a 32-bit or 64-bit microprocessor; one or more input/output (I/O) devices 110, such as a keyboard, mouse, and various communication interfaces, such as Ethernet, universal serial bus (USB) and IEEE 1394; a display 115, such as a liquid crystal display (LCD) monitor, in which a user interface 170 is presented; a storage device 120, such as a hard disk drive (HDD), a solid-state drive (SSD), or an optical drive (e.g., CD, DVD or BD) with appropriate storage media; and a memory 130, such as a volatile or non-volatile memory (e.g., RAM, ROM, flash), all coupled by one or more dedicated buses 125 (only one bus is depicted for chart clarity).

The memory 130 could include, for example, various modules necessary to carry out the method according to an exemplary embodiment of the present invention. Examples of modules stored in the memory 130 are executable native or interpreted software code and related data structures to implement the functions of a quote collector 135, a return deriver 140, an auxiliary library 145, and a fit optimizer 150. Alternatively, these modules may be implemented in a plurality of separate computer systems that are suitably connected, such as a private or public dedicated server pool or shared computing cloud facilities.

The input to the quote collector 135 may, for example, be stored in the source database 175. The source database 175 may, for example, be physically present in the storage device 120, or in a separate computer system or a plurality of computer systems that are suitably connected to the computer system 100, each of such systems containing the whole or a part of the source database 175. The source database 175 may be implemented by one or more of commercial content providers of these data, as is known in the art. In one embodiment, the source database 175 contains the regular close price and distribution data for analyzed portfolios and reference ETPs, as well as supplemental data, such as trading symbols (tickers) and Committee on Uniform Security Identification Procedures (CUSIP) numbers; portfolio and security names; names and contact information of portfolio and security management companies; names and tenure of portfolio managers; amounts and annual turnover of portfolio assets; portfolio composition; and other related information. Other embodiments, in which the source database 175 additionally contains adjusted close price and other types of supplemental data, are also possible.

The output of the quote collector 135 may, for example, be stored in the quote database 180. The quote database 180 may, for example, be physically stored in the storage device 120, or it may be stored in a separate computer system or a plurality of computer systems that are suitably connected to the computer system 100. The quote database 180 contains the close price, distribution, adjusted close price, and supplemental data from the source database 175, aggregated and reconciled over a plurality of content providers, as applicable, by the quote collector 135.

The quote database 180 is an input to the return deriver 140. The output of the return deriver 140 may, for example, be stored in the return database 185. The return database 185 may, for example, be physically stored in the storage device 120, or it may be stored in a separate computer system or a plurality of computer systems that are suitably connected to the computer system 100. The return database 185 contains the periodic linear and logarithmic returns of the analyzed portfolios and reference ETPs. The return database 185 may also contain periodic correlation coefficients among these returns.

The quote database 180 and the return database 185 are inputs to the fit optimizer 150. The output of the fit optimizer 150 may, for example, be stored in the fit database 190. The fit database 190 may, for example, be physically stored in the storage device 120, or it may be stored in a separate computer system or a plurality of computer systems that are suitably connected to the computer system 100. The fit database 190 contains returns of the analyzed portfolio and reference ETPs, weights of the reference ETPs, and performance measures, all separately computed for each analysis period.

The auxiliary library 145 contains a shared collection of executable optimization subroutines and functions, and is linked to and invoked by the fit optimizer 150. In the preferred embodiment, the auxiliary library 145 is separate from and dynamically linked to the fit optimizer 150 to support portfolio analysis and alternative portfolio synthesis subroutines and functions, and to comply with software licensing restrictions. In other embodiments, the auxiliary library 145 may be statically linked with the fit optimizer 150 to form one module.

A user 160 may, for example, access the computer system 100 directly through the I/O devices 110 and the user interface 170, through a dedicated communications link, such as a leased T1 or T3 line, through a private network, such as a local area network (LAN), or through a public network, such as the Internet. If, for example, the user 160 would like to analyze and synthesize alternatives for certain investment portfolios, the user 160 would submit the request to the computer system 100 by providing the portfolios to be analyzed, reference ETPs and the parameters necessary to carry out the request. The computer system 100 may provide the requested information based on processing conducted in real time, or conducted ahead of time and retrieved from the storage device 120 or from storage in a separate computer system or a plurality of computer systems that are suitably connected to the computer system 100. The information may be delivered in graphical, numerical, and descriptive formats suitable for human interpretation, as well as machine-readable formats suitable for further computer processing. For example, the information may be exported into summary and individual report files in Microsoft Excel® format. The information may be provided by the fit optimizer 150 which retrieves the data from the fit database 190 or by a separate module in the memory 130.

The user 160 can also command the computer system 100 to issue investment orders to a brokerage system 199 in order make investments in a reference portfolio comprising ETPs that the computer system 100 has determined are a viable alternative for the analyzed portfolio. The brokerage system 199 can be co-located with the computer system 100 or located remotely and connected via communication links. The brokerage system 199 may include one system or multiple systems that are operated by multiple security trading organizations.

In the preferred embodiment, the quote database 180, the return database 185 and the fit database 190 are all separate databases managed by a commercially-available computer program, such as Microsoft SQL Server 2008 R2. Other embodiments, in which any selections of these databases are combined to form a single database, one or more of these databases are split into a plurality of smaller databases, or different commercially-available or open-source computer programs are used to manage these databases, are also possible.

For the purpose of the following discussion, the user 160 will be synonymous with an investor, either current or prospective, or a non-investing researcher, both conducting analysis of various investment asset portfolios of interest.

Figure 2:
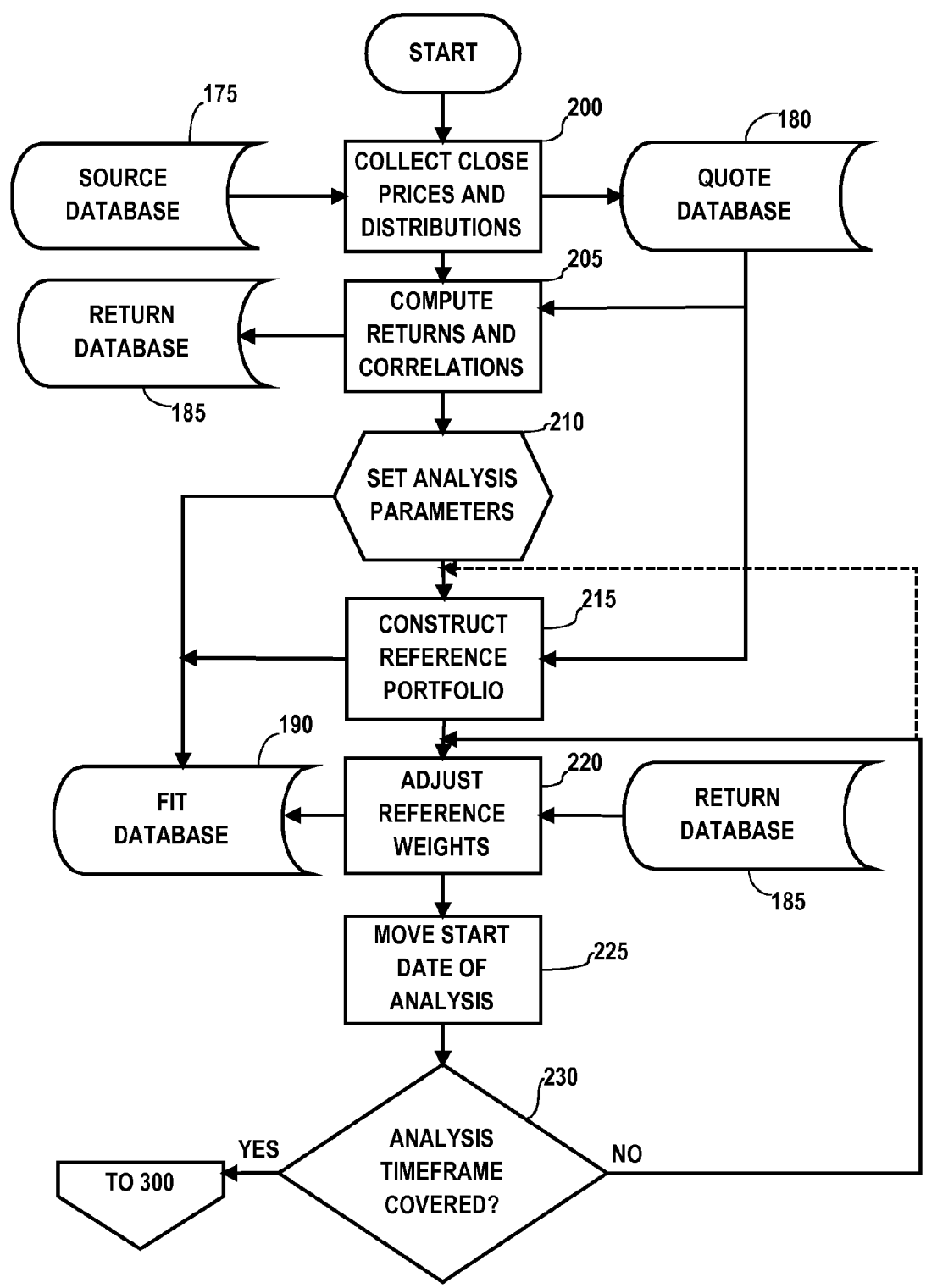
FIG. 2 illustrates an exemplary series of operations performed by computer software for evaluating, substituting and optimizing an investment portfolio according to an exemplary embodiment of the present invention.

Referring to FIG. 2, the computer program that carries out the method of the present invention generally performs a series of steps. Starting in block 200, periodic regular close price and distribution data are collected from the source database 175 for all analyzed portfolios and reference ETPs. In the preferred embodiment, these data are stored in the quote database 180 for local persistence and ease of manipulation; however, other embodiments are also possible. In this block, verification of data is performed, such as a check for valid and contiguous trading dates, as well as for non-negative close prices and distribution values.

It is frequently the case that the data in the source database 175 from commercial content providers are partially erroneous or incomplete. The use of such data would result in significant errors in further analyses. Therefore, in block 200, the obtained data may, for example, be cross-checked and supplemented with data from a plurality of source databases 175 supplied by disparate content providers. In addition, in this block the previously described supplemental data for analyzed portfolios and reference ETPs are collected from the source database 175 and stored in the quote database 180.

Next, in block 205, periodic adjusted close prices are computed, moving backward from the last to the first date of a time period in which a portfolio or security data are available. The input data for this computation are taken from the quote database 180 populated in block 200. The adjusted close prices take into account distributions of the analyzed portfolio, as previously described. For example, a typical actively-managed U.S. stock mutual fund issues a dividend, short-term and long-term capital gain distribution towards the end of each calendar year. When such a mutual fund makes a distribution, its net asset value (NAV) diminishes by the value of the distribution, with fund investors having an option to simultaneously reinvest the proceeds into the fund, while potentially owing taxes on the distribution. If a regular close price instead of an adjusted close price were used to calculate daily returns, an artificially large negative return would likely result on the distribution day, thus introducing errors in further calculations. The adjusted close price is derived from the regular close price and the distribution amount according to formulae known in the art, for example, the one used by the Center of Research in Security Prices (CRSP) at the University of Chicago and the Yahoo! Finance website, which pro-rates dividends to avoid negative adjusted close prices. The computed adjusted close prices are stored in the quote database 180.

As previously noted, in some embodiments of the invention the adjusted close price data may also be present in the source database 175. In this case, these data are copied into the quote database 180, and the computation of the adjusted close prices in block 205 is performed only for verification and correction purposes. For example, the computation may lead to a detection of invalid share split ratios or excessive rounding errors in the source data. In the preferred embodiment, these and other uncorrectable data errors detected earlier in block 200 are marked in the quote database 180 to prevent errors in further analyses.

In the preferred embodiment, taxes are not taken into account in the computation of adjusted close prices. The main reason is that investors have varying tax liabilities and the tax law is undergoing changes. The only general case is that of a non-taxable situation, such as holding the analyzed and reference portfolios in a tax-deferred or tax-exempt account. Similarly, trading costs are not taken into account because such costs vary significantly among investors. The mitigating factor is that many mutual funds have no transaction costs (e.g., front-end or back-end loads), and many ETPs can be traded commission-free in an increasing number of brokerage accounts offered by leading U.S. vendors. Other embodiments that take into account specific taxes and trading costs incurred by investors are also possible.

Next, still in block 205, periodic total returns are calculated from the adjusted close prices. In the preferred embodiment, three time periods are used for this computation: one trading day, one calendar week, and one calendar month, with the adjusted close prices taken at the end of each period. Returns are calculated as linear and/or logarithmic percentages in a manner previously described, and are stored in the return database 185. Other embodiments that employ different time periods for the total return computation are also possible.

Finally, still in block 205, correlations of periodic returns of the analyzed portfolio with those of other analyzed portfolios and ETPs are computed. Given the potentially large number of analyzed portfolios and ETPs, this computation, scaling with the square of the number of correlated assets, may not be practically realizable due to the required processing power and storage space. Therefore, the user 160 may limit the scope of the computation through predetermined settings, for example, by restricting the analysis to a small number of investment categories or securities. Other scope-limiting approaches are possible, for example, computing a correlation of each analyzed portfolio with one well-known reference asset, such as a broad-based market index or its ETP proxy, instead of computing correlations among all analyzed portfolios; this scales linearly with the number of analyzed portfolios. Correlation coefficients obtained in any of the above manners are stored in the return database 185.

Next, in block 210, analysis parameters are set for each analyzed portfolio by the user 160. First, basic time periods for the analysis are determined. A fit interval, such as one day, week or month, constitutes the basic time unit for return analysis. A fit step, such as one week, month or quarter, which in the preferred embodiment is greater than or equal to the fit interval, constitutes a unit of time over which the analyzed portfolio's returns are compared to those of its reference portfolio. A fit span period, such as one month, quarter or year, which in the preferred embodiment is greater than or equal to the fit step, constitutes a unit of time over which the analyzed portfolio's returns are approximated by those of its reference portfolio. For example, the fit interval may equal one trading day, the fit step may equal one month, and the fit span may equal one quarter. In the U.S. financial markets, this results in approximately 21 trading days in the fit step and 63 trading days in the fit span (252 trading days per year). Other embodiments with different basic time period durations and relationships are also possible. In practice, shorter fit interval, fit step and fit span parameters provide better return matching for an analyzed portfolio with a frequently changing composition. However, such shorter periods may also necessitate more frequent adjustments to the reference portfolio, which in turn may cause the investor to be inconvenienced or to incur high trading costs.

Second, still in block 210, additional parameters for the analysis are set. Each of securities in both the analyzed and the reference portfolios has a limited lifespan and, in addition, the analysis timeframe may be subject to user-imposed start and end date constraints. For example, some of the actively-managed mutual funds under analysis, as well as the ETPs used in the reference portfolio, may have been in existence for only a short period of time. The common analysis timeframe is the longest contiguous period of time in which all securities concerned were available for trading. The effective analysis timeframe is the common analysis timeframe subject to user-imposed date constraints, as well as constraints arising from the selection of the fit interval, fit step, and fit span, and their alignment, as described below.

Third, still in block 210, a time alignment is established. In the preferred embodiment, there are two time alignment modes. In the first mode, the beginning date and duration of the analysis are aligned to coincide with the fit step and fit span, respectively. For example, if the fit interval is set to one trading day, the fit step to one month and the fit span to one quarter, the analysis will commence at the end of the calendar month immediately preceding the last date of the effective analysis timeframe and will span three calendar months in each analysis step. This allows for an intuitive interpretation of results that are aligned to natural time boundaries. In the second mode, the analysis commences from the last date of the effective analysis timeframe, which is not necessarily aligned with the fit step, and the fit span is a fixed multiple of the fit interval. For example, if the fit interval is set to one trading day, fit step to one month, and fit span to one quarter, the actual fit step used will equal 21 trading days and the fit span 63 trading days, which are the average numbers for the U.S. market. Other embodiments are also possible that use a different alignment of analysis dates and different durations of the fit interval, fit step and fit span. All analysis parameters set in block 210 are stored, in a direct or indirect form, in the fit database 190.

Next, in block 215, a reference portfolio of ETPs is constructed for each analyzed portfolio. In the preferred embodiment, the reference ETPs may be selected manually or automatically. The manual selection is performed by the user 160. The automatic selection comprises four modes: common, category-specific, portfolio-static, and portfolio-dynamic, one of which is selected by the user 160. In the simplest, common mode, all analyzed portfolios, regardless of their contents or category, share the same predetermined set of reference ETPs that covers a sufficiently broad spectrum of available investment asset classes. Preferably the set of ETPs included in the reference portfolio used in the common mode consists essentially of ETPs that have substantially no overlap in terms of securities held by the ETPs.

In the category-specific mode, all analyzed portfolios classified into the same investment category according to predetermined criteria share the same predetermined set of reference ETPs that are known to form portfolios closely matching the category. In this mode, the reference portfolio for a category includes ETPs collectively corresponding to the investment category of the analyzed portfolio. For example, the analyzed portfolios classified into the domestic large-capitalization stock category may share a set of reference ETPs whose security holdings predominantly include large-capitalization U.S. stocks and cash-like instruments. The reason for including cash-like instrument ETPs in such a reference set is that the analyzed portfolio may at times have a significant cash position because its manager is trying to time the market or cover anticipated redemptions from the analyzed portfolio. In another example, the analyzed portfolios classified into the foreign government bond category may share a set of reference ETPs whose security holdings predominantly include non-U.S. government obligations and cash-like instruments. In yet another example, analyzed portfolios that are classified into a domestic balanced category may share a set of reference ETPs whose security holdings predominantly include U.S. stocks, government and corporate bonds, and cash-like instruments. Examples of ETPs that hold U.S. cash-like instruments are SPDR Barclays Capital 1-3 Month T-Bill ETF and iShares Barclays Short Treasury Bond Fund.

In the portfolio-static mode, each of the analyzed portfolios has its own fixed-membership set of reference securities. The portfolio-dynamic mode is similar to the portfolio-static mode, except that the membership of the set of reference securities may also change in the effective analysis timeframe. In all modes other than the common mode, supplemental data from the quote database 180 are used, if present. In the portfolio-static and portfolio-dynamic modes, a plurality of reference security selection algorithms may be employed. The overall goal is to create a reference portfolio of fewest possible ETPs and least frequent composition changes, while periodic returns of the reference portfolio most closely match those of the analyzed portfolio. In addition, the algorithm must take into account the historical availability of each reference security for trading in a given analysis timeframe. This problem is similar to feature selection and stepwise regression, both known in the art. From a theoretical point of view, globally optimal feature selection requires an exhaustive search of all possible subsets of features. With N available features (reference securities), the number of non-empty subsets equals $2^N-1$, which makes an exhaustive search computationally infeasible for large values of N. Therefore, only local optimizations are practically realizable.

Figure 4:
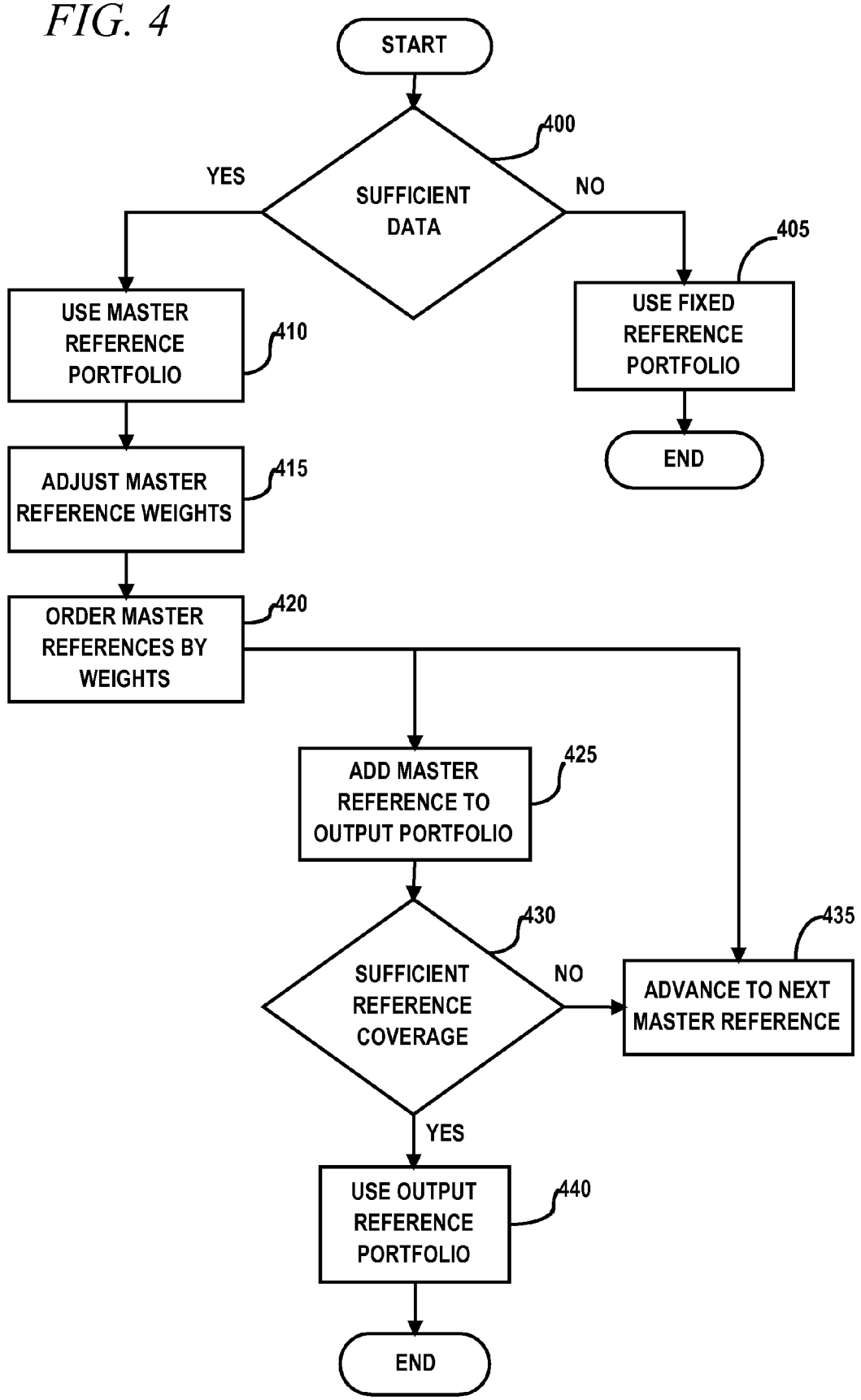
FIG. 4 illustrates an exemplary series of operations performed by computer software for selecting reference securities for analysis of an investment portfolio according to an exemplary embodiment of the present invention.

In the preferred embodiment, for the portfolio-static mode an algorithm described below in the discussion of FIG. 4 is used to select ETPs that are included in the reference portfolio. In another embodiment, a selection algorithm adds ETPs one by one to the reference portfolio on the basis of the best fit of periodic returns, measured, for example, by the highest adjusted coefficient of determination (adjusted R-squared), a procedure similar to forward selection in stepwise regression known in the art. In other embodiments, a procedure similar to backward elimination in stepwise regression or the Efroymson algorithm, both known in the art, may also be used. Other embodiments employing different selection algorithms and strategies are also possible. The results of the reference portfolio construction are stored in the fit database 190.

Next, in block 220, the weights of ETPs in the reference portfolio are adjusted so that the standard deviation of the difference between returns of the analyzed and reference portfolios is minimized for a given fit interval and fit span. Alternatively, the sum of squares of the above difference may be minimized More generally, some function of the difference between the returns of the analyzed and reference portfolios is minimized. The minimizing can be accomplished with the use of one of the many available non-linear optimization algorithms that support constraints, for example, the active set algorithm (ASA) or the Solver component of the Microsoft Excel® spreadsheet program, both known in the art. The optimization is performed with a constraint that the sum total of the ETP security weights in the reference portfolio be equal to 100%. In the preferred embodiment, all the weights must be non-negative, thus constituting long or none positions. In another embodiment, negative weights that constitute short positions may also be permitted; while this generally results in a higher degree of fit, i.e., a higher R-squared, between returns of the analyzed and reference portfolios, short positions in reference securities may not be acceptable to the investor due to increased risk, or not possible in the case of index mutual funds. In other embodiments, additional constraints are also possible, such as the minimum or maximum weight limits on specific ETPs in the reference portfolio. In the portfolio-dynamic mode, in addition to the security weight adjustments, the reference portfolio membership may also be changed, as indicated by a dashed control flow line in FIG. 2.

The input data for block 220 come from the return database 185 contents computed in block 205. The weights and portfolio membership resulting from the minimizing performed in block 220, along with periodic returns of the analyzed portfolio and reference ETPs are stored in the fit database 190 separately for each analysis step.

Next, in block 225 the start date of the analysis period is moved by one fit step and the optimization process in block 220 is repeated until the entire effective analysis timeframe is covered, as checked in block 230. If the analysis starts from the last (newest) date of the effective analysis timeframe, the analysis moves one fit step backward in time, while keeping the same fit interval and fit span. An opposite, forward movement in time from the first (oldest) date of the effective analysis timeframe is also possible and does not alter the analysis results. In either case, the analysis is conducted one analysis step at a time.

Figure 3:
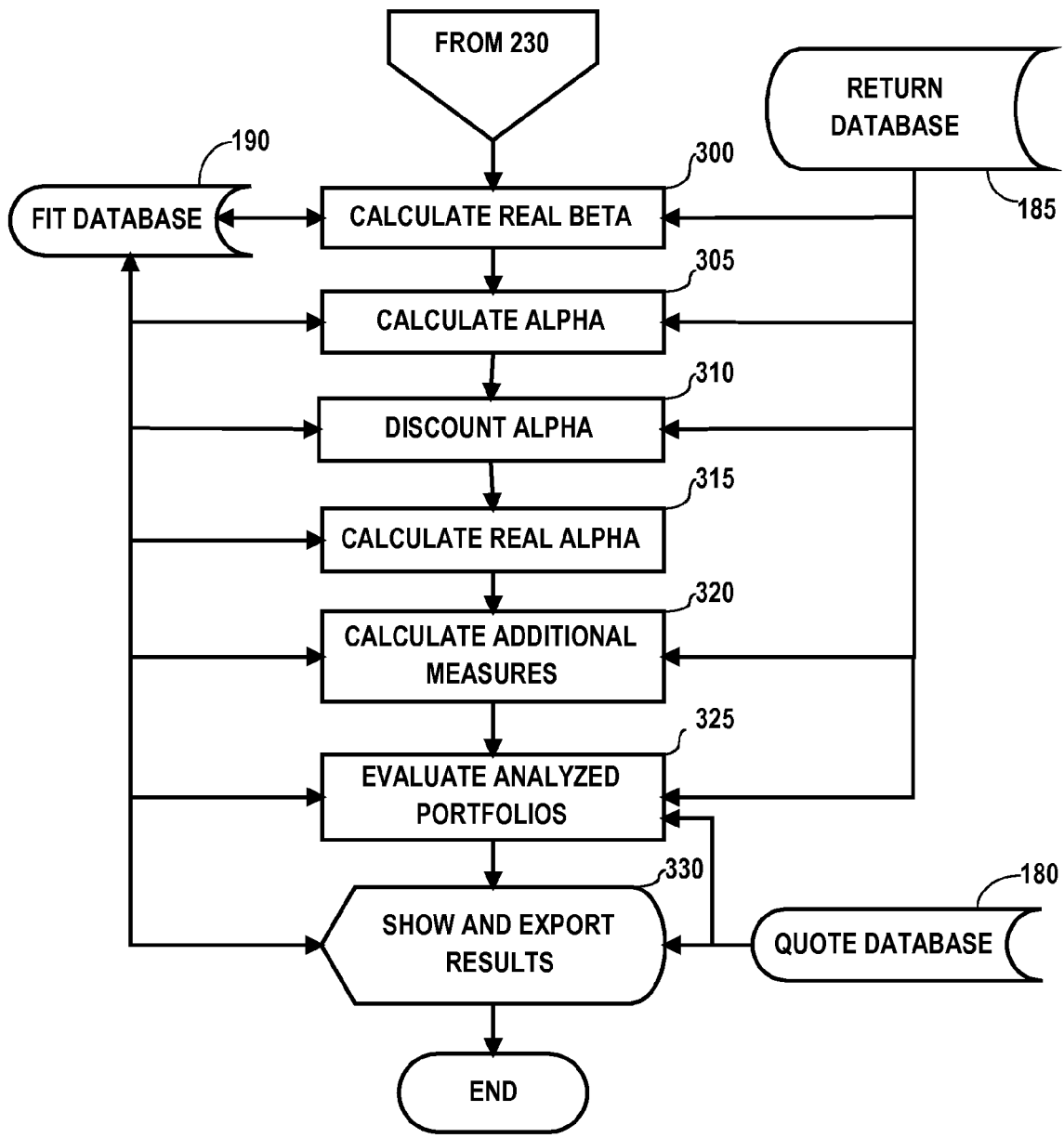
FIG. 3 is a continuation of FIG. 2.

Next, referring to FIG. 3 and continuing in block 300, a beta measure is computed for the analyzed portfolio using the respective returns in each analysis step according to CAPM principles known in the art. In the preferred embodiment, the beta measure attributed to the analyzed portfolio is substantially equivalent to the beta measure of the reference portfolio with respect to a relevant broad market index or its proxy. That is because the reference portfolio can be thought of as the "core" of the analyzed portfolio, explaining most of its returns relative to the market index (or an ETP proxy thereof). For example, if the reference portfolio comprises ETPs representing U.S. stocks, the relevant proxy for the market index may be the Vanguard Total Stock Market ETF (trading symbol VTI) or the SPDR S&P 500 ETF (symbol SPY). Similarly, if the reference portfolio comprises ETPs representing U.S. bonds, the relevant proxy for the market index may be the Vanguard Total Bond Market ETF (symbol BND) or the iShares Barclays Aggregate Bond ETF (symbol AGG). If the reference portfolio comprises ETPs of a plurality of types, a composite of appropriate plurality of broad market indices or their proxies may be used. The selection of broad market indices or their proxies determines the value of the market risk premium factor in the CAPM. In an alternative embodiment, the beta measure attributed to the analyzed portfolio is calculated with respect to the reference portfolio instead of the broad market index (indices) or its proxy (their proxies). In this case, the composition of the reference portfolio determines the value of the market risk premium factor. Other embodiments with different modes of calculation of the beta measure in accordance with the general CAPM principles are also possible. In the preferred embodiment, two calculation modes are employed: perfect-foresight and lag. In the perfect foresight mode, the fit step and fit span periods overlap in time; this corresponds to a hypothetical situation in which an investor could perfectly foresee the behavior of the analyzed portfolio. In the lag mode, the fit step immediately leads the span period in time; this corresponds to a practical case of the reference portfolio weights having been calculated from historical data and applied for a period of time into the future. Other embodiments with different time relations of the fit step and fit span periods are also possible. The resulting beta values are called Real Beta and Lag Real Beta, respectively, and are subsequently used to ascertain the volatility of returns of the analyzed portfolio and to discount alpha, as described below.

Next, in block 305, for each analysis step, an excess or shortage of the analyzed portfolio returns with respect to the reference portfolio returns (alpha) is calculated. To calculate alpha, the reference portfolio assumes ETP security membership and weights obtained in block 220. The calculation is separately carried out for both the perfect-foresight and lag modes described above.

Next, in block 310, the alpha values calculated for each analysis step are discounted to the beginning of the effective analysis timeframe. The calculation is separately carried out for both the perfect-foresight and lag modes described above. The economic basis for this procedure is a concept of time value of money known in the art. To the investor, the value of excess returns of the analyzed portfolio diminishes if such returns are realized further into the future and at a higher risk. The discount rate may be determined in multiple ways. In the preferred embodiment, the discount rate is derived for each analysis step according to the CAPM principles, i.e., based on the level of the risk-free rate; market risk premium of a broad market index or its proxy, or a composite of appropriate plurality of broad market indices or their proxies; and the Real Beta of the reference portfolio with respect to the aforementioned market index (indices) or its proxy (proxies) described above, using the following formula $$R_{ADi} = (R_{Fi} + \beta_{RMi} * R_{MRPi})/M$$

where $R_{ADi}$ is the alpha discount rate, $R_{Fi}$ is the annual risk-free rate, $\beta_{RMi}$ is the Real Beta of the reference portfolio with respect to the market index (indices) or its proxy (proxies), $R_{MRPi}$ is the annual market risk premium of the aforementioned index (indices) or its proxy (proxies), i is the index of the analysis step in the range of [0, N−1] where N is the total number of analysis steps, and M is the number of fit steps per one year. This approach relates to the notion that the alpha of the analyzed portfolio could be considered as risky as the analyzed portfolio itself. In another embodiment, the discount rate is similarly derived based on the level of risk-free rate, market risk premium of the reference portfolio, and the Real Beta coefficient of the analyzed portfolio with respect to the reference portfolio described above, using the following formula $$R_{ADi} = (R_{Fi} + \beta_{ARi} * R_{RRPi})/M$$

where $R_{ADi}$ is the alpha discount rate, $R_{Fi}$ is the annual risk-free rate, $\beta_{ARi}$ is the Real Beta of the analyzed portfolio with respect to the reference portfolio, $R_{RRPi}$ is the annual market risk premium of the reference portfolio, i is the index of the analysis step in the range of [0, N−1] where N is the total number of analysis steps, and M is the number of fit steps per one year. In yet another embodiment, the discount rate is derived as in the preferred embodiment described above, except that the beta coefficient of the CAPM is calculated from the correlation and standard deviation of the pre-discounted alpha and the standard deviation of returns of the market index (indices) and its proxy (proxies) using the following formula $$\beta_{AMi} = \rho_{AMi} * (\sigma_{Ai}/\sigma_{Mi})$$

where $\beta_{AMi}$ is the beta coefficient of the pre-discounted alpha with respect to the market, $\rho_{AMi}$ is the correlation coefficient between the pre-discounted alpha and market returns, $\sigma_{Ai}$ is the standard deviation of the pre-discounted alpha, $\sigma_{Mi}$ is the standard deviation of market returns, and i is the index of the analysis step in the range of [0, N−1] where N is the total number of analysis steps. This approach gives high ratings to analyzed portfolios exhibiting low-volatility and low-correlation alphas. In all three embodiments, the discount factor for the alpha in the $k^{th}$ analysis step is calculated using the following formula $$F_k = \Pi_{0 \ldots k}[1/(1+R_{ADi})]$$

where $F_k$ is the discount factor for the $k^{th}$ analysis step in the range of [0, N−1] where N is the total number of analysis steps, $R_{ADi}$ is the alpha discount rate, and i is the index of the analysis step in the range of [0, k]. The alpha value for each $k^{th}$ analysis step is multiplied by the corresponding $F_k$ discount factor to obtain a discounted alpha value. The discounted alpha values for all analysis steps are summed to obtain a discounted cumulative alpha. Other embodiments that utilize differently derived discount rates are also possible.

In one embodiment, the risk-free rate is obtained from the rate of return of the U.S. government obligations with maturity dates matching the effective analysis timeframe. The market risk premium of the reference portfolio is obtained from a linear regression of excess returns of individual reference securities on excess returns of a total market index or its ETP proxy with a known risk premium in the effective analysis timeframe, and a subsequent application of weights calculated for each reference security in each analysis step. In another embodiment, the risk-free and market risk premium rates are assumed to be long-term market averages and are fixed in the effective analysis timeframe. Other embodiments are possible that derive the risk-free rate and market risk premium values in a different manner.

Next, in block 315, the sum of discounted alpha values (i.e., the discounted cumulative alpha) is annualized based on the duration of the effective analysis timeframe and the fit step using the following formula $$Alpha_{AD} = [(1+Alpha_{SD})^{(M/N)}] - 1$$

where $Alpha_{AD}$ is the annualized discounted alpha, $Alpha_{SD}$ is the sum of the discounted alpha values from each analysis step, M is the number of fit steps per one year, and N is the total number of analysis steps.

The calculation is separately carried out for both the perfect-foresight and the lag modes described above. The resulting values are called annualized Real Alpha and Lag Real Alpha, respectively, and are subsequently used for a uniform evaluation of performance of the various analyzed portfolios.

Next, in block 320, additional measures of fit between and performance of the analyzed and reference portfolio returns are calculated for both the perfect-foresight and lag modes in each analysis step. The standard deviation of returns of the analyzed and reference portfolios measures the degree of dispersion of those returns about their respective means. The regular coefficient of determination (R-squared) measures the degree of variance of returns of the analyzed portfolio explained by the variance of returns of the reference portfolio. The adjusted R-squared, unlike the regular R-squared, increases only if an addition of ETP security to the reference portfolio improves the fit more than would be expected by chance. The Sharpe ratio, known in the art, measures the return-to-risk characteristic of the analyzed and reference portfolios. In other embodiments, additional performance measures known in the art, such as the Treynor ratio, Sortino ratio, and information ratio, may also be calculated. Together, all these measures inform the investor about the quality of the analyzed portfolio with respect to the available alternatives. In particular, analyzed portfolios exhibiting high Real Alpha and Sharpe ratio measures generally constitute desirable investment opportunities.

Next, in block 325, evaluating, i.e., rating and ranking, of the analyzed portfolio is performed. In particular, but not only in the case of actively-managed mutual funds, portfolios may first be grouped into investment categories based on common characteristics obtained from the previously described analysis or by other methods. In one embodiment, an investment category is determined by the highest average reference security weights in the effective analysis timeframe. In another embodiment, one or more of external classifications of the analyzed portfolio holdings are applied, such as the ones that can be obtained from commercial rating agencies and stored as supplemental data in the quote database 180. In yet another embodiment, the investment category is determined from characteristics of the individual securities in the analyzed portfolio, for example, taking into account only the dominant holdings. Other embodiments using different classification methods are also possible.

Analyzed portfolios with a negative or zero annualized Real Alpha measures do not exhibit risk-adjusted returns above those of available ETP alternatives, and thus, generally, do not merit an investment. Portfolios with positive annualized Real Alpha measures are rated as investment-worthy, and ranked according to the ascending value of the measure, i.e., the highest value receiving the highest rank. In the preferred embodiment, the range of positive annualized Real Alpha measures is divided into partitions, for example quintiles or deciles, with each partition receiving a corresponding number of measurement points, such as performance stars, to facilitate a rapid and intuitive grasp by investors. In another embodiment, annualized Real Alpha measures are used without partitioning to rank analyzed portfolio on an ordinal basis, which is especially applicable when the number of analyzed portfolios is relatively small. Other embodiments that employ different evaluation criteria are also possible.

Additionally, still in block 325, based on analysis results, inferences can be made as to the future performance of the analyzed portfolio. If an analyzed portfolio exhibits a consistent historical pattern of stable Real Alpha (growing cumulative Real Alpha), and there is no substantial change in portfolio management, it can be inferred that the beneficial portfolio performance may continue into the near future. Conversely, analyzed portfolios exhibiting a pattern of negative Real Alpha (diminishing cumulative Real Alpha) may likely continue to underperform their reference portfolios. Other types of inferences from previous analysis results are also possible. Predictive information obtained in such a manner is stored in the fit database 190. Outputting Real Alpha information to the user 160 enables the user 160 to make informed investment decisions.

Finally, still in block 325, the return and risk performance of the analyzed portfolio can be improved with an addition of one or more securities or other portfolios that exhibit low correlation with the analyzed portfolio. Such complementary securities or portfolios can be identified based on the correlations computed in block 205, stored in the return database 185 and output to the user 160 through the user interface 170.

The benefit of adding such securities or portfolios can be determined using the mean-variance MPT techniques known in the art. Other embodiments that employ different performance improvement techniques are also possible. Any results derived in this manner are also stored in the fit database 190.

In the end block 330, the results of evaluating the analyzed portfolio are shown to the user 160 in an interactive manner. In the preferred embodiment, the user 160 can filter the results according to a number of criteria, for example, the investment category of the analyzed portfolio, the value of portfolio assets, the length of portfolio manager's tenure, the levels of expense ratio and annual asset turnover, obtained from the supplemental data previously stored in the quote database 180 in block 200. Other embodiments may implement fewer or more of such filter criteria, in accordance with the contents of the quote database 180. In the preferred embodiment, the user 160 can export the filtered analysis results from the fit database 190 in a number of formats, for example, Microsoft Excel® files with numerical and pictorial representation of the data. Other embodiments may support exporting of the filtered analysis results in other static or interactive, industry-standard or proprietary formats and media, for example, a free or subscription-based website accessible over the Internet, electronic mail, instant messages, text messages on mobile devices, optical disks, USB flash drives, HDDs, and printed materials.

In each of the blocks 300, 305, 310, 315, 320, 325 and 330, the fit database 190 is used as a source of input data as well as a repository of output data. In each of the blocks 300, 305, 310, 320 and 325, the return database 185 is used as a secondary source of input data. In block 325, the quote database 180 is used as tertiary source of input data. In block 330, the quote database 180 is used as a secondary source of input data.

Referring to FIG. 4, a computer program that carries out a method of the present invention generally performs a series of actions to select reference ETPs to be included in a reference portfolio in the portfolio-static mode described above. Starting in block 400, a check is made if the effective analysis timeframe comprises a sufficient number of fit steps. Preferably, at least 20 fit steps are required. For example, if the fit step is set to one month, 24 fit steps, corresponding to a period of two years, may be used.

If the result of the check made in block 400 is negative, then in block 405 a fixed default portfolio is chosen as the reference portfolio. The fixed default portfolio is predetermined to match either the investment category of the analyzed portfolio (as in the previously described category-specific mode) or to represent a sufficiently broad spectrum of available investment asset classes (as in the previously described common mode).

If the result of the check performed in block 405 is affirmative, then in block 410 a master reference portfolio is selected for further processing. The master reference portfolio comprises dissimilar ETPs that are chosen to collectively provide a good fit for a wide range of analyzed portfolios in the longest common timeframe. Optionally, in selecting ETPs for inclusion in the master reference portfolio, preference can be given to ETPs with low expense ratios.

Next, in block 415 the weights of securities in the master reference portfolio are adjusted so that the difference (or a function of the difference, such as the standard deviation of the difference or the sum of squares of the difference) between returns of the analyzed and master reference portfolios is minimized in the entire effective analysis timeframe. Non-linear optimization is used to determine the set of weights of securities in the master reference portfolio such that the aforementioned difference (of function of the difference) between the returns of the portfolio to be analyzed and the master reference portfolio is minimized. The minimizing is performed in an analogous manner to that in block 220 in FIG. 2, except that periodic returns for each fit step instead of fit interval are used. For example, if the effective analysis timeframe is five years, the fit interval is one trading day and the fit step is one month, the minimizing is conducted with the use of 60 monthly returns. The weights are normalized so that their sum is equal to 100%.

Next, in block 420 the master reference portfolio securities are ordered (ranked) in the descending order of their weights that resulted from block 415. Securities with the highest weights are deemed to provide a good heuristic reference for the analyzed portfolio in the entire effective analysis period and for each fit span in that period. Still in block 420, an empty output portfolio is created.

Next, in block 425 the master reference portfolio security with the highest weight is added to the output portfolio. This way, the output portfolio is guaranteed to contain at least one security.

Next, in block 430 a check is made if the output portfolio provides a sufficient coverage for the analyzed portfolio. In the preferred embodiment, if one or more of the three heuristic criteria are satisfied, the result of the check is affirmative: (1) the number of securities present in the output portfolio reaches a predetermined number limit, suitably a pre-programmed value between 1 and 100, preferably between 5 and 20, and more preferably between 8 and 15, (2) the sum of weights of securities present in the output portfolio exceeds a predetermined percent limit, suitably a pre-programmed value between 50% and 99.9%, preferably between 75% and 99.9%, and more preferably between 95% and 99.0%, or (3) the weight of the added security is less than a predetermined threshold, which is suitably a pre-programmed value between 0.1% and 10%, preferably between 0.1% and 5% and more preferably between 0.5% and 2%. Exemplary values for the foregoing parameters are 12, 99% and 1%, respectively. Other embodiments may use different numerical values for the above criteria or use different criteria.

If the result of the check performed in block 430 is negative, then the selection advances to the security with the next highest weight in the master reference portfolio and blocks 425 and 430 are repeated.

If the result of the check performed in block 430 is affirmative, then in the terminal block 440, the resulting output portfolio is used as a reference portfolio for further analysis in the previously described portfolio-static mode.

The method shown in FIG. 4 for selecting ETPs for inclusion in the reference portfolio will often produce a reference portfolio which is a composite of disparate ETPs that correspond to different investment focuses. The reference portfolio may consist essentially of such a composite of ETPs but also include other ETPs of marginal importance, i.e., with small weights. The composite typically matches the analyzed portfolio in terms of the different focus areas of investment. On the other hand, if the analyzed portfolio has a narrow investment focus, the method shown in FIG. 4 may produce a reference portfolio consisting essentially of ETPs corresponding to the narrow focus.

FIG. 5 shows an exemplary graphical user interface (GUI) 170 embodiment of the user interface 170 presented to the user 160 in the display 115. Using the GUI 170, the user 160 can select a portfolio to be analyzed or compose an analyzed portfolio of publicly-traded securities. The GUI 170 comprises a plurality of input fields, buttons and other graphical or text elements that the user 160 can edit and operate with the I/O devices 110. A portfolio name field 505 contains an alphanumeric string that uniquely identifies the analyzed portfolio. A portfolio selection list 507 contains a plurality of alphanumeric strings, each of which identifies a previously saved analyzed portfolio, which the user 160 may select for analysis, modification or deletion. The start date field 510 and the end date field 515 contain the beginning and end dates, respectively, that define the lifetime of the analyzed portfolio. If the end date field 515 is empty, the analyzed portfolio's lifetime is assumed to extend till present time. A plurality of security symbol fields 520 contains trading symbols of securities in the analyzed portfolio, such as tickers of mutual funds. A plurality of quantity fields 525 contains a number of shares of each security specified in the corresponding symbol field 520; these positive numbers may be fractional for mutual funds but are generally whole for other securities. A plurality of acquisition date fields 530 contains dates on which each of the corresponding securities was added to the analyzed portfolio. If the acquisition date field 530 is empty, the date in the start date field 510 is implied. A plurality of disposition date fields 535 contains dates on which each of the corresponding securities was removed from the analyzed portfolio. If the disposition date field 535 is empty, the date in the end date field 515 is implied. For each security, the specific or implied disposition date has to be later than the corresponding specific or implied acquisition date. An add button 550 creates an additional set of security symbol fields 520, quantity fields 525, acquisition date fields 530, and disposition date fields 535 in the user interface 170, so that more securities can be added to the analyzed portfolio. An import button 560 facilitates importation of the analyzed portfolio data from an external file, for example, a Microsoft Excel® file or a comma-separated value (CSV) file. A save button 570 terminates data entry and saves the analyzed portfolio data. A delete button 580 removes all data of the analyzed portfolio. A cancel button 590 terminates data entry and discards all data additions or modifications made to the analyzed portfolio. When the analyzed portfolio is complete, the data provided by the user 160 are combined with historical periodic returns of each security to determine periodic returns of the portfolio. This facilitates further analysis conducted as previously described.

Another embodiment of the user interface 170 is used to construct an analyzed portfolio when the underlying securities are not traded publicly, are traded infrequently, or cannot be disclosed. In that case, the user 160 simply provides periodic returns of the entire analyzed portfolio between the start date 510 and the end date 515. Given that the entry of a large amount of such data may be impractical, the data importation function facilitated by the button 560 becomes of greater importance.

Other embodiments of the user interface 170 that facilitate an entry of the analyzed portfolio data and the analysis parameters described above are also possible. For example, the acquisition date fields 530 and disposition date fields 535 may not be present, thus mandating that all securities were present in the analyzed portfolio between the dates specified in the start date field 510 and the end date field 515.

Figure 6:
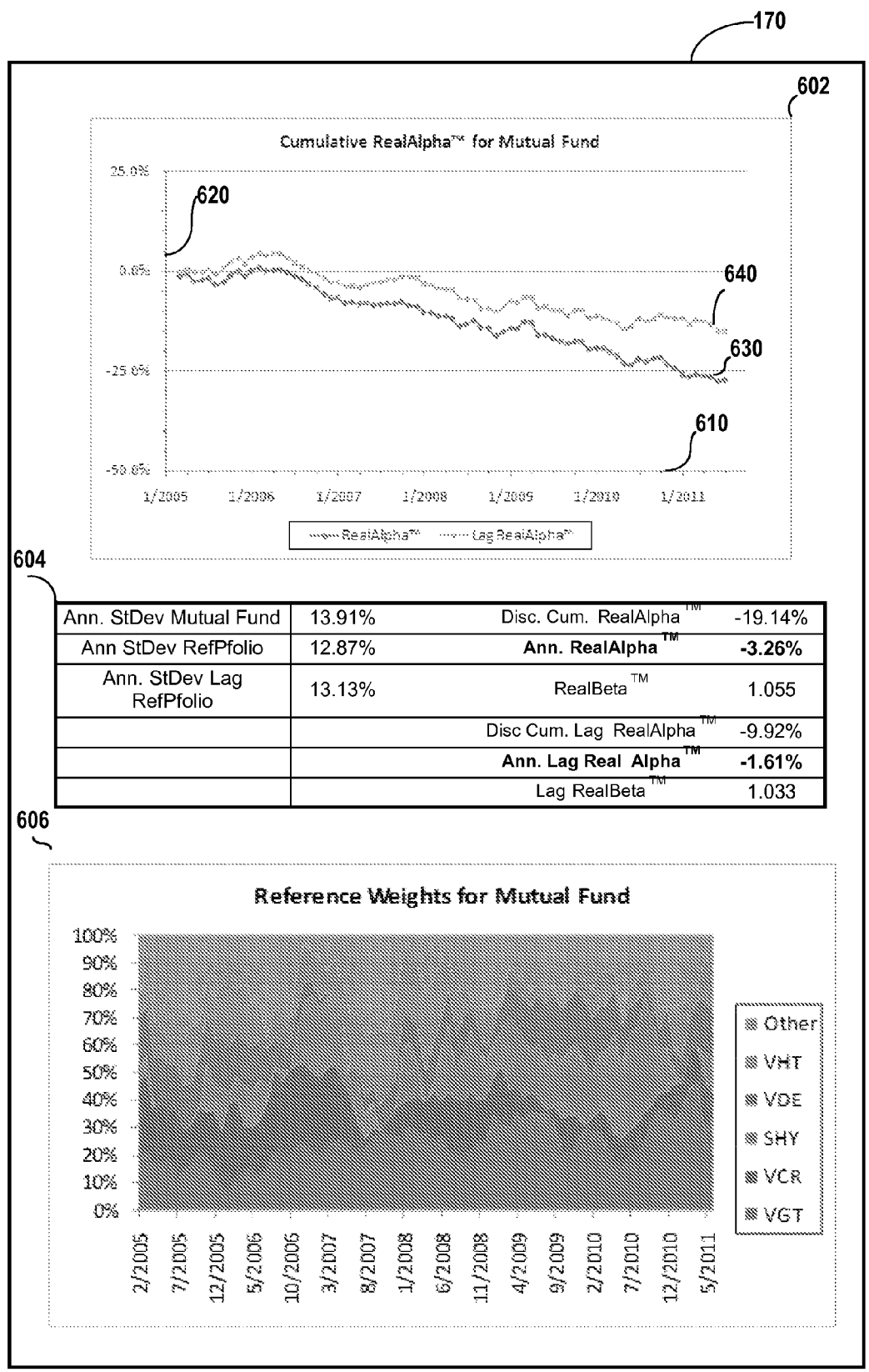
FIG. 6 illustrates another exemplary embodiment of the user interface implemented by the system of FIG. 1.

FIG. 6 illustrates an exemplary embodiment of the user interface 170 presented to the user 160 in the display 115 to show the results of an analysis of a mutual fund. The user interface 170 comprises a graphical representation of the cumulative Real Alpha 602 having a first axis 610 corresponding to the effective analysis timeframe, a second axis 620 corresponding to a fractional return, a first plot line 630 corresponding to a cumulative Real Alpha in the perfect-foresight mode, and a second plot line 640 corresponding to a cumulative Real Alpha in the lag mode. The user interface 170 further comprises a numerical data output table 604. In table 604 "Ann."=annualized, "Disc."=discounted, "Cum."=cumulative, "StDev"=standard deviation, and "RefPfolio"=reference portfolio. The user interface 170 also comprises a graph 606 showing the composition of a reference portfolio over time in terms of the weights of each of a plurality of the most significant ETP components of the reference portfolio. Other embodiments depicting analysis results in various alternative graphical, textual or numeric formats are also possible. In the case shown in FIG. 6, the cumulative Real Alpha is largely negative and trending downward, meaning that the analyzed portfolio has performance that is inferior the reference portfolio that has been synthesized by the system 100.

Figure 7:
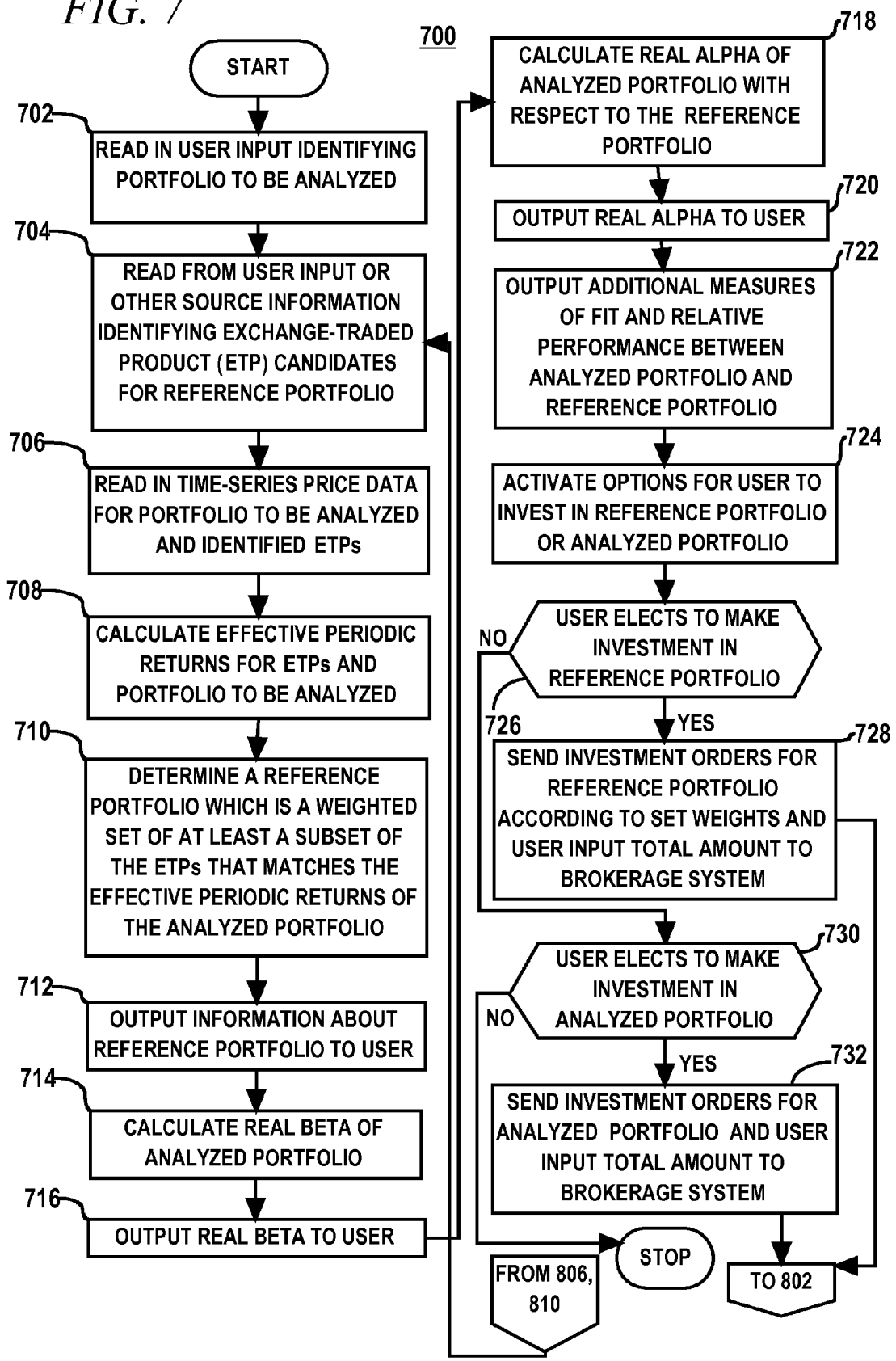
FIGS. 7-8 illustrate a method of operation of the system shown in FIG. 1 for synthesizing a reference portfolio that is equivalent or superior to an analyzed portfolio and semi-automatically investing in either the reference portfolio, the analyzed portfolio or neither.

FIG. 7 shows a method of operation 700 of the system 100 shown in FIG. 1 for synthesizing a reference portfolio that in some cases is equivalent or superior to an analyzed portfolio and semi-automatically investing in the reference portfolio or the analyzed portfolio.

In block 702, information identifying a portfolio to be analyzed (i.e., the analyzed portfolio) is read in. The portfolio to be analyzed may be a single security (e.g., a mutual fund) or alternatively the user 160 may compose the portfolio to be analyzed by selecting multiple securities and specifying the number of shares, the percentage weight, or dollar value of each in the portfolio to be analyzed. The user 160 may also specify acquisition and disposition dates and prices for each security in the portfolio to be analyzed.

In block 704, information identifying candidate ETPs for the reference portfolio that is to be used to match the analyzed portfolio is read in. Optionally at this point the user 160 may also specify one of the aforementioned automatic ETP selection modes, e.g., common, category-specific, portfolio-static or portfolio-dynamic or use manual selection.

In block 706, time-series (e.g., daily) price data for the portfolio to be analyzed and the candidate ETPs are read in from the quote database 180.

In block 708, the effective daily returns of the ETP candidates for the reference portfolio and the effective daily returns of the analyzed portfolio are computed. The effective daily returns are based on the adjusted close prices discussed above.

In block 710, a reference portfolio which includes, at least, a subset of the candidate ETPs and the returns of which best match (at least in a local optimum sense) the effective periodic returns of the analyzed portfolio is determined While non-linear optimization routines described above that can be used to match the effective periodic returns of the reference portfolio to the returns of the analyzed portfolio are not guaranteed to find the global optimum match, they are designed to, at least, find a local optimum. The reference portfolio determined in block 710 is a weighted set of candidate ETPs. Weights of the weighted set are determined in the process of matching the periodic returns of the reference portfolio to the periodic returns of the analyzed portfolio using the aforementioned non-linear optimization routine.

In block 712 information about the reference portfolio is output to the user 160 through the user interface 170. The information can, for example, include the identity of the ETPs in the reference portfolio, the weight of each ETP in the reference portfolio, and text describing the focus of each ETP.

In block 714, Real Beta of the analyzed portfolio is calculated as described above. In block 716 the Real Beta is output to the user 160 through the user interface 170.

In block 718, Real Alpha of the analyzed portfolio with respect to the reference portfolio is calculated and in block 720 the Real Alpha is output to the user 160 through the user interface 170.

In block 722, additional measures of fit and relative performance between the reference portfolio and analyzed portfolio are output to the user 160 through the user interface 170. These measures can, for example, include the above mentioned Sharpe ratio, Treynor ratio, Sortino ratio, and information ratio. The additional information output to the user 160 assists the user 160 in making an informed decision about making an investment in the reference portfolio or the analyzed portfolio.

In block 724, options for the user 160 to invest in the reference portfolio or analyzed portfolio are activated through the user interface 170. For this purpose, virtual buttons in the user interface 170 may be made active.

Block 726 is a decision block, the outcome of which depends on whether the user 160 elects to invest in the reference portfolio. Inputs such as a dollar amount input field may also be used to obtain input from the user 160 as to an amount of money to be invested in the reference portfolio or the analyzed portfolio.

If the outcome of block 726 is affirmative, meaning that the user 160 elects to invest in the reference portfolio, the method of operation 700 branches to block 728 in which the system 100 issues a set of orders to the brokerage system 199 to invest the amount of money specified by the user 160 in the reference portfolio in proportions according to the weights of the ETPs in the reference portfolio.

If the outcome of block 726 is negative, the method of operation 700 branches to block 730, the outcome of which depends on whether the user 160 elects to invest in the analyzed portfolio. If the outcome of block 730 is affirmative, then the method of operation 700 branches to block 732 in which the system 100 issues a set of orders to the brokerage system 199 to invest in the analyzed portfolio. If, on the other hand, the outcome of block 730 is negative then the method of operation 700 terminates until such time as the user 160 reinitiates use of the system 100.

Figure 8:
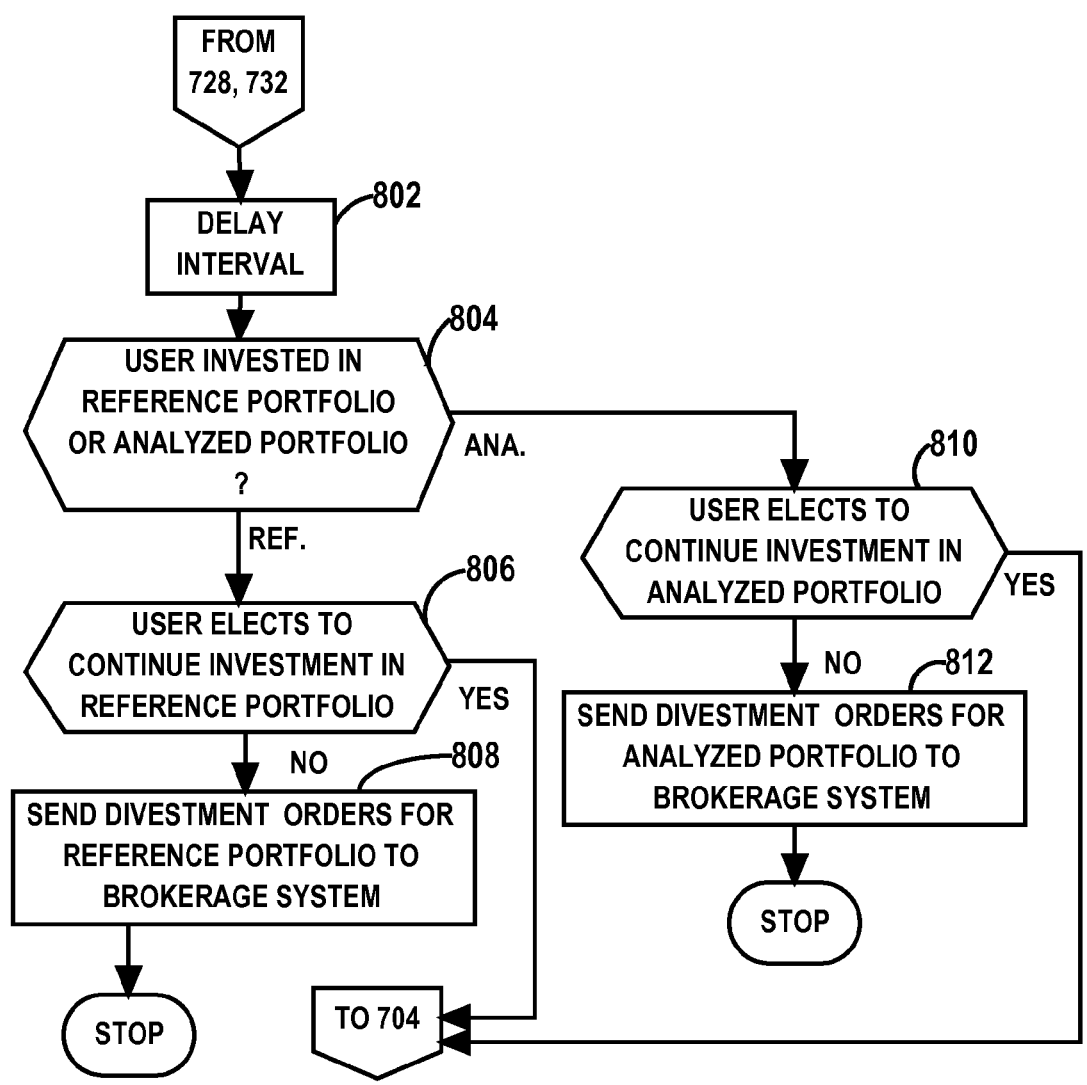

After either block 728 or 732, the method of operation 700 continues with block 802 shown in FIG. 8, which is a delay. The delay 802 can be a fixed period delay such as a day, week or month after which the system initiates contact with the user 160 (e.g., via an emailed link) to ascertain if the user 160 wishes to continue to invest in the reference portfolio or the analyzed portfolio. Alternatively the delay may be controlled by the user 160 choice of when to reengage with the system 100 through the user interface 170. The system 100 can operate in such a manner that the user 160 can at anytime command divestment from the reference portfolio or analyzed portfolio.

After the delay 802, the method of operation 700 reaches decision block 804 the outcome of which depends on whether the user 160 is invested in the reference portfolio or the analyzed portfolio. If the user 160 is invested in the reference portfolio, then method of operation 700 continues with block 806, the outcome of which depends on whether the user 160 elects to continue investing in the reference portfolio. If the outcome of block 806 is affirmative meaning that the user 160 wishes to continue to invest in the reference portfolio, then the system branches back to block 704 in order to read information identifying candidate ETPs, re-compute the periodic returns of the candidate ETPs and portfolio to be analyzed, re-determine the reference portfolio and proceed as previously described. Note that between successive executions of block 704 the set of candidate ETPs can change. For example, if the delay in 802 was sufficiently long, additional ETPs may have gained enough history to be included in this set. Conversely, some candidate ETPs may have become unavailable (e.g., their sponsor decided to remove these ETPs from the market or merge them with other ETPs). The re-determined reference portfolio may have an identical set of ETPs as a preceding iteration reference portfolio or a non-identical set of ETPs. Proceeding as previously described the system 100 can, at the discretion of the user 160, ultimately issue a second set of orders to invest in the re-determined reference portfolio. Alternatively the system 100 can be designed such that once the user 160 elects to invest in the reference portfolio, no changes are made to the reference portfolio. As a further alternative the system 100 can be designed to give the user 160 the option, at any time, to re-determine the reference portfolio or to continue investing in the reference portfolio without changes. If the outcome of block 806 is negative, then the method of operation 700 proceeds to block 808, in which the system 100 issues orders to the brokerage system 199 to divest from the reference portfolio and then the method of operation 700 terminates until such time as the user 160 reinitiates use of the system 100.

If the outcome of decision block 804 indicates that the user 160 is invested in the analyzed portfolio, then the method of operation 700 branches to decision block 810 the outcome of which depends on whether the user 160 wishes to continue investing in the analyzed portfolio. If the outcome of decision block 810 is affirmative then the method of operation loops back to block 704 and proceeds as previously described. If, on the other hand, the outcome of decision block 810 is negative, then the method of operation 700 proceeds to block 812 in which the system 100 issues orders to the brokerage system 199 to divest from the analyzed portfolio, after which the method of operation terminates until such time as the user 160 reinitiates use of the system 100.

Additional advantages and modifications will readily occur to those skilled in the art. Therefore, the present invention in its broader aspects is not limited to the specific details and representative devices shown and described herein. Accordingly, various modifications may be made without departing from the spirit or scope of the general inventive concept as defined by the appended claims.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed:

1. A computer program product providing computerized financial information, stored on a non-transitory computer-readable medium which when executed causes a computer system to perform a method, comprising:

reading information identifying a portfolio to be analyzed;

reading information identifying a set of candidate exchange-traded products that are available to be used in a reference portfolio;

computing a first set of periodic returns for the portfolio to be analyzed and a first set of periodic returns for the identified set of candidate exchange-traded products where each return period is a predetermined interval;

selecting, within a predetermined range of equivalency, a reference portfolio that is a first weighted set of at least a subset of the set of candidate exchange-traded products whose periodic returns represent a best match for the first set of periodic returns of the portfolio to be analyzed;

calculating an alpha discount rate, using any of the following formulae:

$$R_{ADi} = (R_{Fi} + \beta_{RMi} * R_{MRPi})/M,$$

or $$R_{ADi} = (R_{Fi} + \beta_{ARi} * R_{RRPi})/M,$$

or $$R_{ADi} = (R_{Fi} + \beta_{AMi} * R_{MRPi})/M,$$

where $R_{ADi}$ is the alpha discount rate, $R_{Fi}$ is the annual risk-free rate, $\beta_{RMi}$ is the beta of the reference portfolio vs. the market index (indices) or its proxy (proxies), $R_{MRPi}$ is the annual market risk premium of the aforementioned index (indices) or its proxy (proxies), i is the index of the analysis step in the range of [0, N−1] where N is the total number of analysis steps, M is the number of fit steps per one year, $\beta_{ARi}$ is the beta of the analyzed portfolio vs. the reference portfolio, $R_{RRPi}$ is the annual market risk premium of the reference portfolio, $\beta_{AMi}$ is calculated using the following formula:

$$\beta_{AMi} = \rho_{AMi} * (\sigma_{Ai}/\sigma_{Mi}), \text{ where:}$$

$\rho_{AMi}$ is the correlation coefficient between the pre-discounted alpha and market returns, σAi is the standard deviation of the pre-discounted alpha, σMi is the standard deviation of market returns, and i is defined above; and outputting information about the reference portfolio to a user.

2. The computer program product according to claim 1 wherein, in determining said reference portfolio, the computer is programmed to use non-linear optimization to determine a set of weights of said first weighted set such that a measure of difference between the first set of periodic returns of the portfolio to be analyzed and periodic returns of the reference portfolio is minimized.

3. The computer program product according to claim 1 wherein said computer is further programmed to compute an alpha value of said analyzed portfolio relative to said reference portfolio and output said alpha value to the user.

4. The computer program produce according to claim 3 wherein said computer is further programmed to discount said alpha value prior to outputting said alpha value to the user.

5. The computer program product according to claim 3 wherein said computer is further programmed to discount and annualize said alpha value prior to outputting said alpha value to the user.

6. The computer program product according to claim 3 wherein in computing said alpha value, said computer is programmed to:

compute a series of alpha values for a series of time periods;

compute a series of discount rates for said series of time periods;

compute a series of discount factors from said series of discount rates;

multiply each alpha value by a corresponding discount factor for each of said series of time periods to obtain a series of discounted alpha values;

sum said series of discounted alpha values to obtain a discounted cumulative alpha; and annualize said discounted cumulative alpha.

7. The computer program product according to claim 6 wherein said discount rates are a function of at least one beta value computed for said analyzed portfolio.

8. The computer program product according to claim 1 wherein said computer is further programmed to communicate with a brokerage system in order to issue a first set of orders to invest in said reference portfolio in proportion to a set of weights of said first weighted set.

9. The computer program produce according to claim 8 wherein said computer is further programmed to, after determining said reference portfolio, after a period of time:
   re-read information identifying the set of candidate exchange-traded products;
   re-compute the first set of periodic returns of the portfolio to be analyzed and each set of candidate exchange-traded products;
   re-determine said reference portfolio as a new first weighted set of at least a subset of the set of candidate exchange-traded products whose periodic returns represent the best match for the re-computed first set of periodic returns of the portfolio to be analyzed.

10. The computer program product according to claim 9 wherein said first weighted set and said new first weighed set do not include an identical subset of the set of candidate exchange-traded products.

11. The computer program product according to claim 9 wherein said first weighted set and said new first weighed set include an identical subset of the set of candidate exchange-traded products.

12. The computer program product according to claim 9 wherein said computer is further programmed to:
   communicate with said brokerage system in order to issue second set of orders to invest in said reference portfolio in proportion to a set of weights of said new first weighted set.

13. The computer program product according to claim 1 wherein said computer is further programmed to compute a beta value of said analyzed portfolio with respect to a market index, and output the beta value to said user.

14. The computer program product according to claim 1 wherein said computer is further programmed to compute a beta value of said analyzed portfolio with respect to said reference portfolio and output said beta value to said user.

15. The computer program product according to claim 1 wherein determining the reference portfolio comprises determining a reference portfolio that consists of exchange-traded products collectively corresponding to an investment category of the analyzed portfolio.

16. The computer program product according to claim 1 wherein the reference portfolio consists of exchange-traded products that have substantially no overlap in terms of securities in their portfolios.

17. The computer program product according to claim 1 wherein selecting said subset comprises computing a second set of periodic returns of said portfolio to be analyzed and said candidate exchange-traded products, wherein said second set of periodic returns are computed each second interval, wherein said second interval is greater than or equal to said predetermined interval;
   determining a second weighted set of the set of candidate exchange-traded products whose periodic returns represent the best match for the second set of periodic returns of the portfolio to be analyzed;
   ranking the second weighted set of candidate exchange-traded products in decreasing order according to weights in the second weighted set; and
   selecting a number of the highest-ranking candidate exchange-traded products as the subset of the second weighted set of candidate exchange-traded products to be compared with the portfolio to be analyzed using the first set of periodic returns.

18. The computer program product according to claim 17 wherein, in determining said second weighted set, the computer is programmed to use non-linear optimization to determine weights of said second weighted set such that a measure of difference between the second set of periodic returns of the portfolio to be analyzed and periodic returns of the second weighted set is minimized.

19. The computer program product according to claim 17 wherein a number of candidate exchange-traded products included in said subset is determined by meeting at least one criterion selected from the group consisting of:
   the number reaches a preprogrammed number;
   the sum of the weights of the number of candidate exchange-traded products included in said subset exceeds a preprogrammed limit;
   a next candidate exchange-traded product beyond the number of candidate exchange-traded products included in said subset has a weight less than a preprogrammed threshold.

20. The computer program product according to claim 19 wherein said weights in said second weighted set are normalized to sum to 100%, the preprogrammed number is between 1 and 100, the preprogrammed limit is between 50% and 99.9% and the preprogrammed threshold is between 0.1% and 10%.

21. The computer program product according to claim 20 wherein the preprogrammed number is between 5 and 20, the preprogrammed limit is between 75% and 99.9% and the preprogrammed threshold is between 0.1% and 5.0%.

22. The computer program product according to claim 21 wherein the preprogrammed number is between 8 and 15, the preprogrammed limit is between 95% and 99.9% and the preprogrammed threshold is between 0.5% and 2.0%.

23. The computer program product according to claim 1 comprising a graphical user interface and wherein said information identifying said portfolio to be analyzed is read through said graphical user interface and information about the reference portfolio is output through the graphical user interface.

24. A comprising a computer, having a processor and at least one memory, wherein the computer is configured to:
   cause the processor to read information identifying a portfolio to be analyzed and store the information in the memory;
   cause the processor to read information identifying a set of candidate securities that are available to be used in a reference portfolio;
   cause the processor to compute first sets of periodic returns of the portfolio to be analyzed and each of the set of candidate securities;

cause the processor to determine, within a predetermined range of equivalency, a reference portfolio which is a first weighted set of at least a subset of the set of candidate securities whose periodic returns represent a best match for the first set of periodic returns of the portfolio to be analyzed;

cause the processor to compute an alpha value of said analyzed portfolio relative to said reference portfolio by calculating an excess or shortage of the analyzed portfolio returns with respect to the reference portfolio returns (alpha) and a beta measure attributed to the analyze portfolio;

cause the processor to calculate an alpha discount rate, using any of the following formulae:

$$R_{ADi}=(R_{Fi}+\beta_{RMi}*R_{MRPi})/M,$$

or $$R_{ADi}=(R_{Fi}+\beta_{ARi}*R_{RRPi})/M,$$

or $$R_{ADi}=(R_{Fi}+\beta_{AMi}*R_{MRPi})/M,$$

where $R_{ADi}$ is the alpha discount rate,
$R_{Fi}$ is the annual risk-free rate,
$\beta_{RMi}$ is the beta of the reference portfolio vs. the market index (indices) or its proxy (proxies),
$R_{MRPi}$ is the annual market risk premium of the aforementioned index (indices) or its proxy (proxies),
i is the index of the analysis step in the range of [0, N−1] where N is the total number of analysis steps,
M is the number of fit steps per one year,
$\beta_{ARi}$ is the beta of the analyzed portfolio vs. the reference portfolio,
$R_{RRPi}$ is the annual market risk premium of the reference portfolio,
βAMi is calculated using the following formula:

$$\beta_{AMi}=\rho_{AMi}*(\sigma_{Ai}/\sigma_{Mi}), \text{ where:}$$

$\rho_{AMi}$ is the correlation coefficient between the pre-discounted alpha and market returns,
σAi is the standard deviation of the pre-discounted alpha,
σMi is the standard deviation of market returns, and
i is defined above; and cause the processor to output information about the reference portfolio to a user.

25. The computer according to claim 24, wherein the computer is further configured to annualize a sum of discounted alpha values using the following formula:

$$\text{Alpha}_{AD}=[(1+\text{Alpha}_{SD})^{(M/N)}]-1$$

where:
$\text{Alpha}_{AD}$ is the annualized discounted alpha,
$\text{Alpha}_{SD}$ is the sum of discounted alpha values from each analysis step,
M is the number of fit steps per one year, and
N is the total number of analysis steps.

26. The computer program product according to claim 1, further comprising annualizing a sum of discounted alpha values using the following formula:

$$\text{Alpha}_{AD}=[(1+\text{Alpha}_{SD})^{(M/N)}]-1$$

where:
$\text{Alpha}_{AD}$ is the annualized discounted alpha,
$\text{Alpha}_{SD}$ is the sum of discounted alpha values from each analysis step,
M is the number of fit steps per one year, and
N is the total number of analysis steps.

27. A computer program product providing computerized financial information, stored on a non-transitory computer-readable medium which when executed causes a computer system to perform a method comprising:

reading information identifying a portfolio to be analyzed;

reading information identifying a set of candidate exchange-traded products that are available to be used in a reference portfolio;

selecting, within a predetermined range of equivalency, a reference portfolio that is a first weighted set of at least a subset of the set of candidate exchange-traded products whose periodic returns represent a best match for a first set of periodic returns of the portfolio to be analyzed;

calculating an alpha discount rate, using any of the following formulae:

$$R_{ADi}=(R_{Fi}+\beta_{RMi}*R_{MRPi})/M,$$

or $$R_{ADi}=(R_{Fi}+\beta_{ARi}*R_{RRPi})/M,$$

or $$R_{ADi}=(R_{Fi}+\beta_{AMi}*R_{MRPi})/M,$$

where $R_{ADi}$ is the alpha discount rate,
$R_{Fi}$ is the annual risk-free rate,
$\beta_{RMi}$ is the beta of the reference portfolio vs. the market index (indices) or its proxy (proxies),
$R_{MRPi}$ is the annual market risk premium of the aforementioned index (indices) or its proxy (proxies),
i is the index of the analysis step in the range of [0, N−1] where N is the total number of analysis steps,
M is the number of fit steps per one year,
$\beta_{ARi}$ is the beta of the analyzed portfolio vs. the reference portfolio,
$R_{RRPi}$ is the annual market risk premium of the reference portfolio,
$\beta_{AMi}$ is calculated using the following formula:

$$\beta_{AMi}=\rho_{AMi}*(\sigma_{Ai}/\sigma_{Mi}), \text{ where:}$$

$\rho_{AMi}$ is the correlation coefficient between the pre-discounted alpha and market returns,
σAi is the standard deviation of the pre-discounted alpha,
σMi is the standard deviation of market returns, and
i is defined above; and outputting information about the reference portfolio to a user.

* * * * *

UNITED STATES PATENT AND TRADEMARK OFFICE
CERTIFICATE OF CORRECTION

| | |
|---|---|
| PATENT NO. | : 8,554,656 B2 |
| APPLICATION NO. | : 13/314132 |
| DATED | : October 8, 2013 |
| INVENTOR(S) | : Marek R. Kotelba |

It is certified that error appears in the above-identified patent and that said Letters Patent is hereby corrected as shown below:

In the Claims:

-Column 22, Claim 4, Line 57, after "program" and before "according"

Please replace "produce", with -- product --

-Column 23, Claim 9, Line 21, after "program" and before "according"

Please replace "produce", with -- product --

-Column 24, Claim 24, Line 57, after "A" and before "computer"

Please delete "comprising a"

Signed and Sealed this

Third Day of December, 2013

Margaret A. Focarino

*Commissioner for Patents of the United States Patent and Trademark Office*